Feb. 6, 1934. J. BIJUR 1,945,512
LUBRICATION
Filed Aug. 10, 1925 5 Sheets-Sheet 4
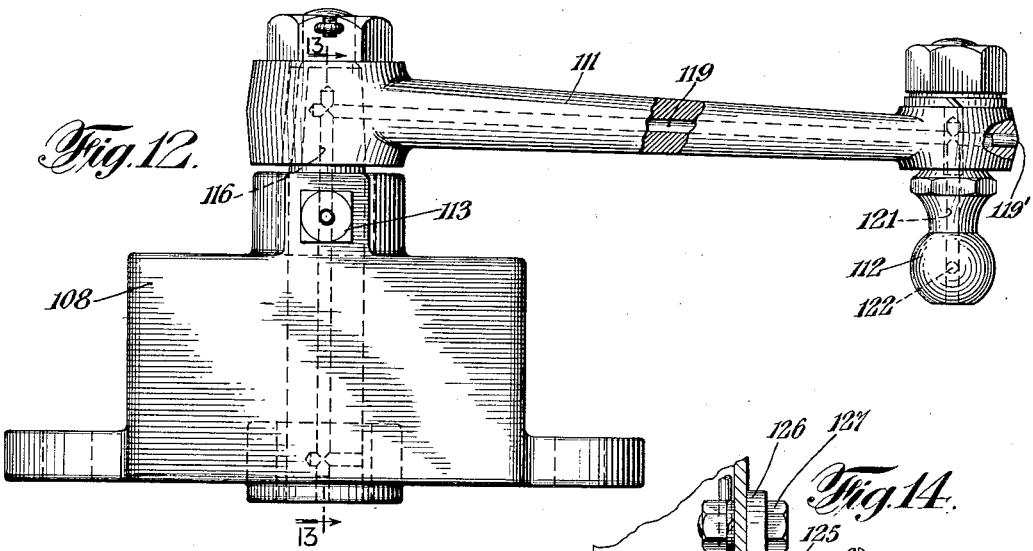
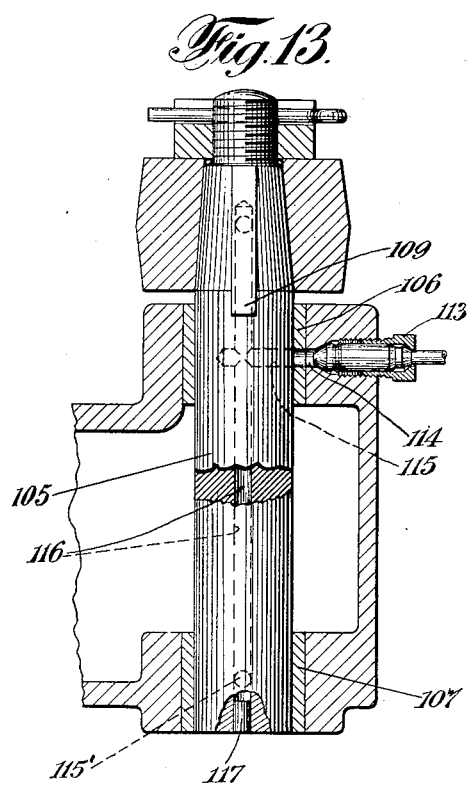
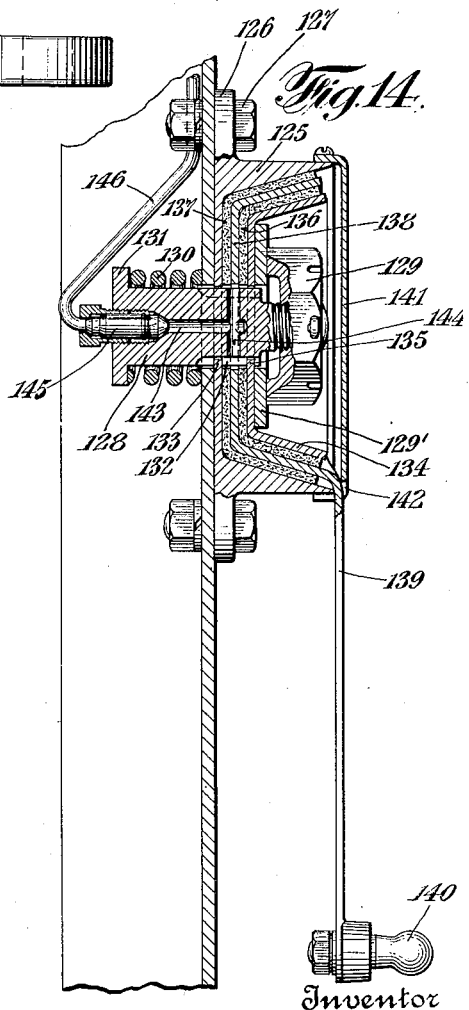
Inventor
Joseph Bijur
By his Attorneys
Dean, Fairbank, Olright & Hirsch

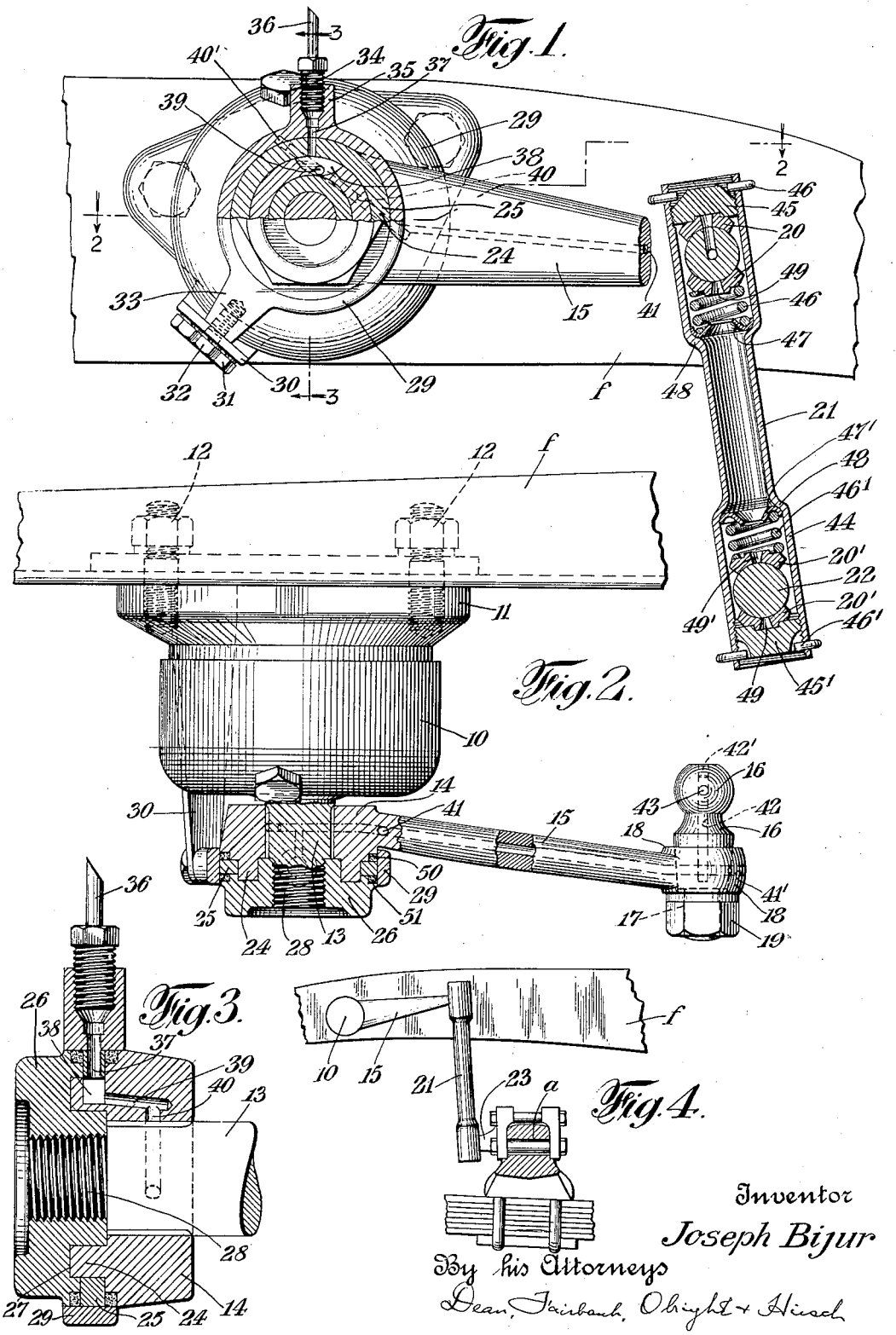

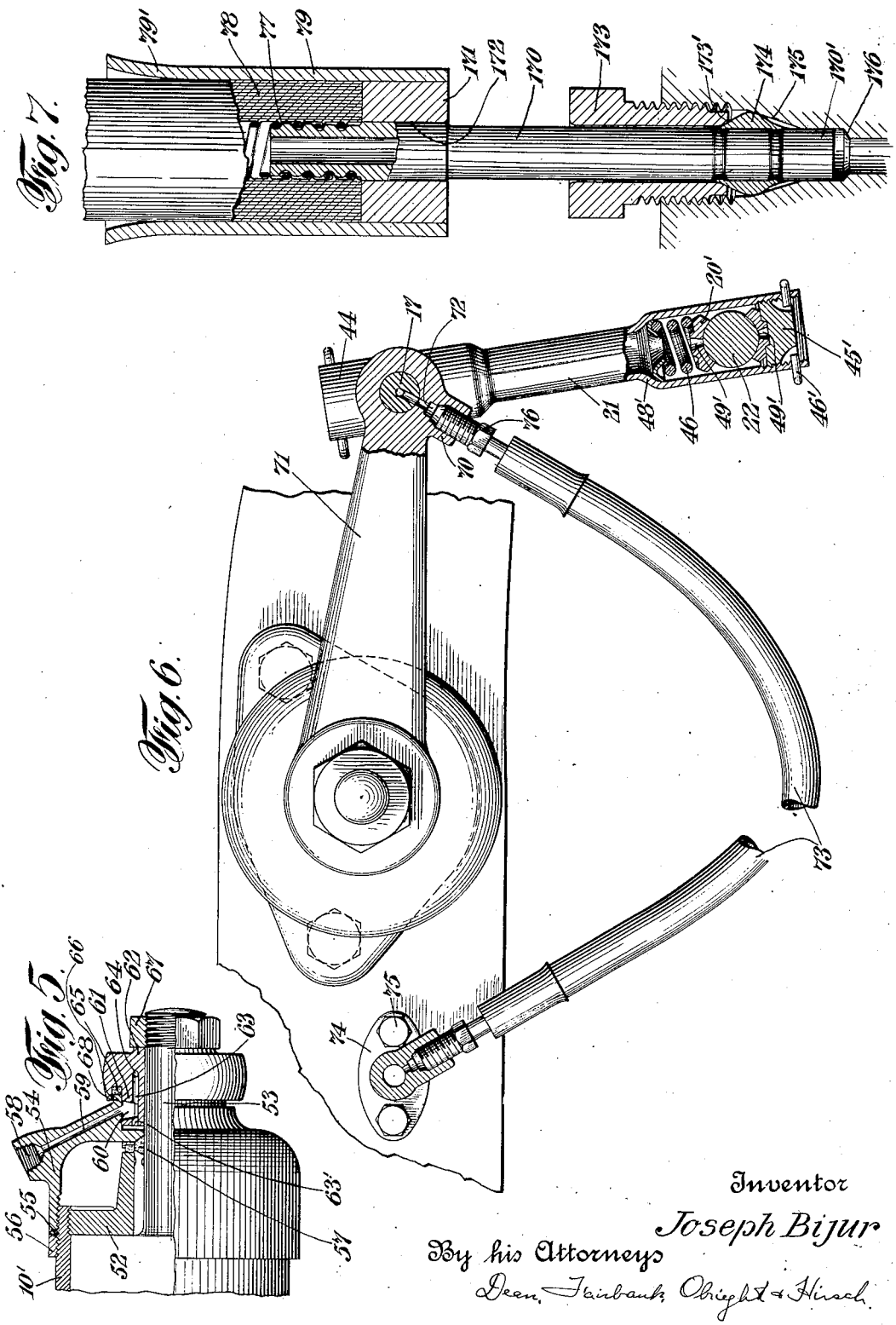

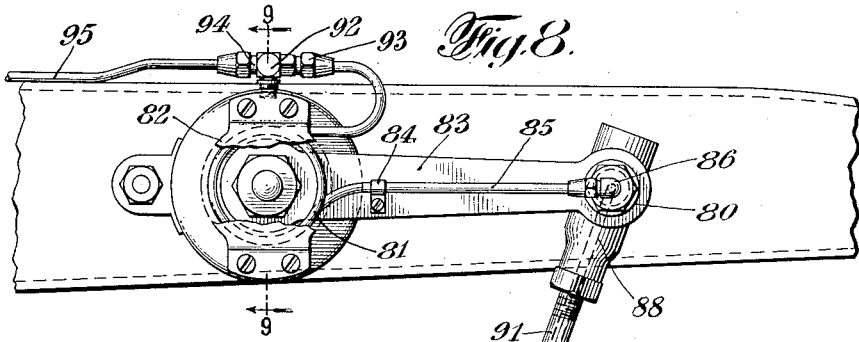
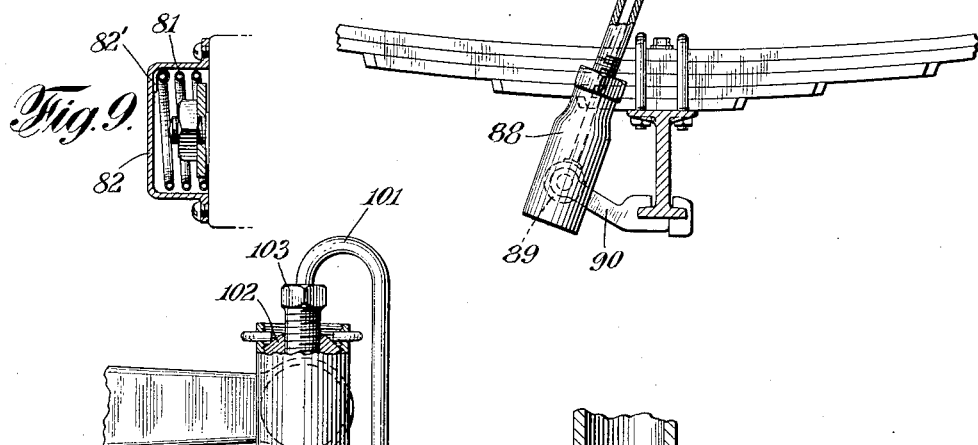
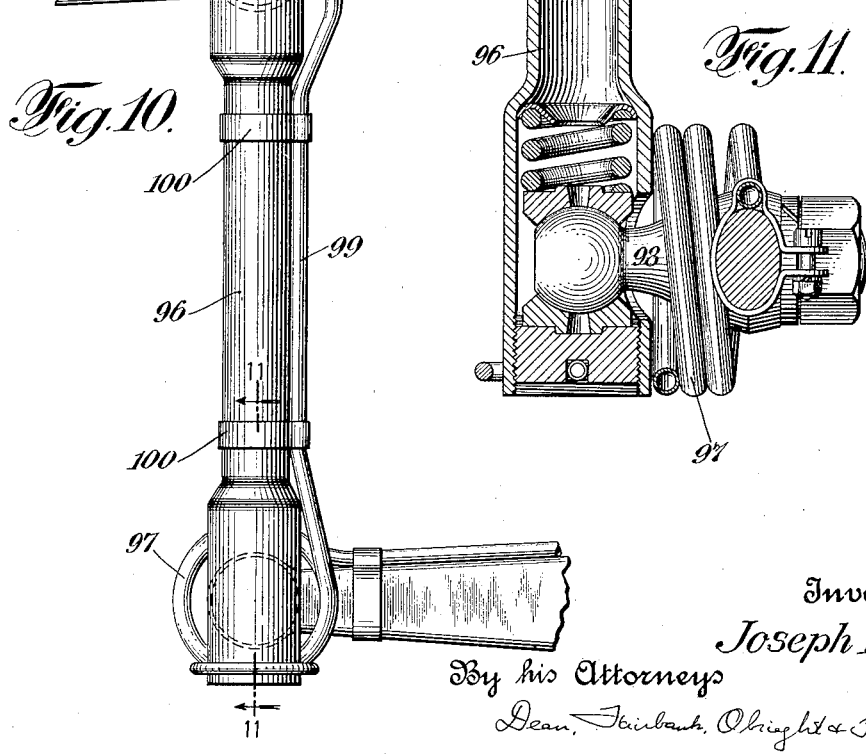

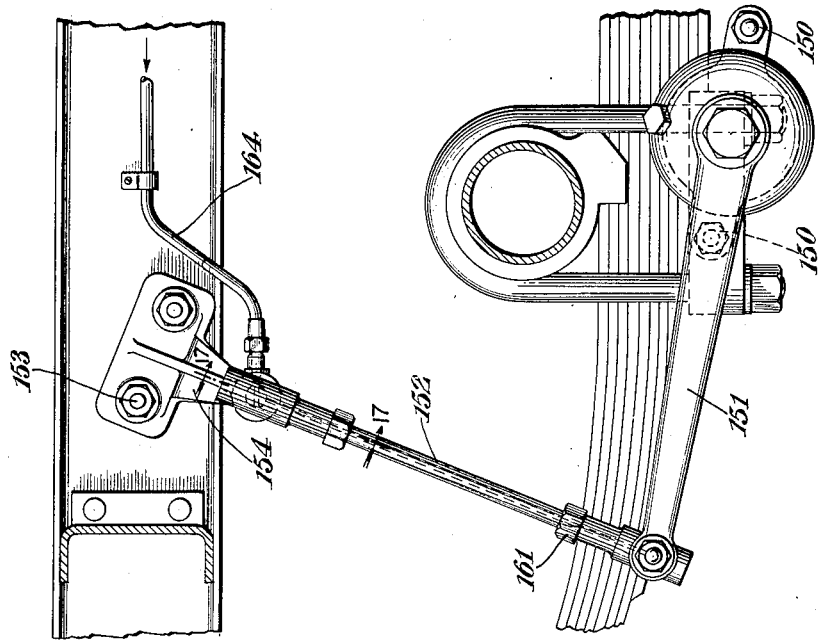
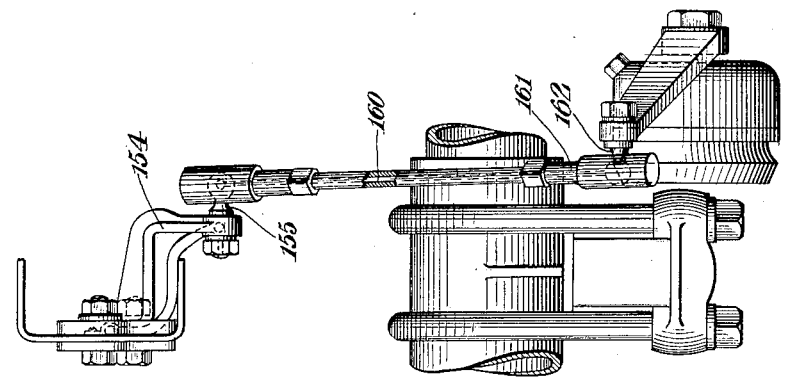
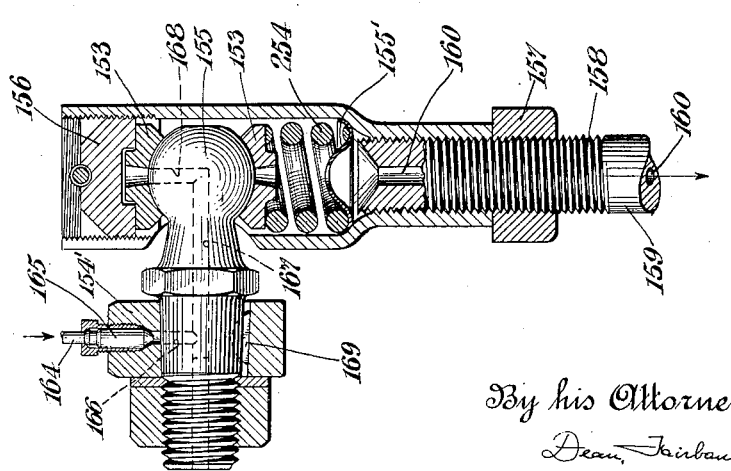

Patented Feb. 6, 1934

1,945,512

UNITED STATES PATENT OFFICE 1,945,512

LUBRICATION

Joseph Bijur, New York, N. Y., assignor to Auto Research Corporation, a corporation of Delaware Application August 10, 1925. Serial No. 49,439

39 Claims. (Cl. 184—7)

My present invention relates to lubrication and more especially to the lubrication of automotive chassis elements and particularly instrumentalities such as shock absorbers or rebound checks associated with a motor vehicle and to the supply of lubricant to the casing of a shock absorber.

Lubrication is desired for the interior bearings and pivot joints of the links of shock absorbers of the liquid resistance and friction clutch types, and also in some instances, for the rubbing surfaces of the latter type of shock absorber.

It is among the objects of the invention to provide an arrangement for adequately lubricating without excessive overflow each of the bearings of or associated with a shock absorber, that require lubrication, and to accomplish this without separate manual operations at the bearings, and without loose or flapping lubricant conduits that might become strained or broken in running of the vehicle.

Another object is to provide a lubricating installation of the type mentioned which shall in no way interfere with the efficacy of operation of the instrument itself or with the convenient mounting or installation thereof and which shall necessitate no alteration in the operative principle of such instrument.

Another object is to provide a lubricating installation of the type mentioned that can be readily embodied in various types of shock absorbers of more or less conventional and well known form without substantial reorganization in the parts thereof.

Another object is to provide an arrangement in which the bearings of various shock absorbers on a vehicle, both in the casing and at the various links, can all be simultaneously lubricated from a centralized source of pressure that serves for applying lubricant at various bearings associated with the chassis, and this without the need for any attention or manipulation at the shock absorbers themselves, and without impairing the efficacy of the centralized system that serves the shock absorber.

According to my invention, in its preferred mode of execution, there is provided a lubricant inlet to each of the shock absorbers, which inlet leads lubricant to the casing and/or to the uppermost pivot bearing of the link, the latter being specially formed hollow therebelow to convey downward by gravity flow to the lower bearing thereof, excess of lubricant from the upper pivot bearing. The lubricant inlet to each of the shock absorbers may be of the same type as the other bearing inlets supplied from the common source of centralized lubricating system, said inlets being of the flow controlling, preferably the "drip-plug" type.

The flow controlling inlet in one type of embodiment may be carried at the upper pivot joint of the link, seamless pressure-tight metal piping formed with extra length, preferably conformed as a helix coaxial with one of the pivotal mounts of the linkage accommodating the displacement of the pivot joint as the vehicle springs are flexed in locomotion. The helical conformation may be coaxial with the resistance instrument mounted on the frame and may lead to a duct lengthwise of the arm on the instrument to the pivot joint at the outer end thereof, or where a pressure conduit extends along the axle, the helical conformation thereof may be formed at the axle end of the link, a conduit thence extending upward along the generally vertical link to the pivot joint, at the upper end thereof.

In another type of embodiment, the flow controlling inlet is fixed to the vehicle frame either on or adjacent the fixed casing of the shock absorber instrument to feed thereinto.

In one application of this type, the inlet may be carried directly by the instrument, special passages being provided through the instrument casing for conveying the lubricant from the stationary inlet to the rocking arm that is connected to the instrument and from which the pivot bearing at the outer end thereof is supplied. A compression gasket is preferably interposed between the stationary inlet fitting and the rocking hub of the instrument-connected arm, said gasket serving to prevent the entry of dust and to minimize the escape of lubricant.

In another application of the type last mentioned, a drooping conduit of flexible hose, one preferred form of which is known as "Titeflex", bridges from the side of the instrument opposite the arm and in advance of which the inlet fitting may be applied across to the outer end of the arm, said conduit extending preferably in the plane of movement of the arm, or one parallel thereto, so that it is not subjected to destructive twisting as the shock absorber functions.

In another application of this type, the lubricant inlet fitting is applied to the stationary part of the instrument to feed into a bore in that shaft of the instrument upon which the rod arm is keyed, an appropriate passageway being provided to convey the lubricant along the arm to the link bearings.

Where the resistance instrument is carried on the axle instead of on the frame of the motor vehicle, the lubricant may be admitted through an inlet fixed at the frame to the pivoted upper end of the generally vertical link whence excess passes downward through the hollow link structure to the bearing at the lower end thereof.

In the accompanying drawings,

Fig. 1 is an elevation partly in longitudinal cross-section of one embodiment of the invention, Fig. 2 is a sectional view with parts in plan taken on line 2—2 of Fig. 1, Fig. 3 is a detail in section on line 3—3 of Fig. 1, Fig. 4 is a side elevation on a reduced scale showing the mode of application of the instrument, Fig. 5 is a fragmentary detail in longitudinal cross-section of a modified form of instrument adapted for lubrication.

Fig. 6 is an elevation with parts broken away of a modification,

Fig. 7 is a fragmentary view in longitudinal section showing the detail of the non-twist terminal, Fig. 8 is a view similar to Fig. 2 of another embodiment of the invention, showing the instrument applied to the vehicle, Fig. 9 is a fragmentary sectional view on line 9—9 of Fig. 8, Fig. 10 is a fragmentary elevation of a further embodiment, Fig. 11 is a view in longitudinal section on line 11—11 of Fig. 10, Fig. 12 is a plan view of another embodiment, Fig. 13 is a fragmentary sectional view on line 13—13 of Fig. 12, Fig. 14 is a sectional view of another embodiment, Fig. 15 is a side elevation of a further embodiment of the invention, Fig. 16 is an elevation viewed from an end of the vehicle of the embodiment of Fig. 15, and Fig. 17 is a fragmentary sectional view taken on line 17—17 of Fig. 15 and on an enlarged scale.

In Figs. 1 to 4 of the drawings, I have shown a shock absorber or rebound check instrument, having a casing 10 secured at its flange 11 by bolts and nuts 12 to the frame f of a motor vehicle. The instrument is of any familiar construction of the fluid resistance type and the details are not shown inasmuch as these in themselves are not material to the present invention, it being merely noted that such fluid resistance instruments include vanes (not shown) on a rock shaft restrained in operation by the resistance of the liquid within the instrument, which liquid inherently lubricates the mechanism parts submerged therein. The operating or rock shaft of the instrument protrudes as at 13 axially from the instrument and has splined thereto, the hub 14 of an arm 15 extending generally horizontally from the instrument. At the outer end, the arm is provided preferably with a ball stud 16 the shank 17 of which extends through a corresponding eye 18 therein and is tightened by means of a nut 19. The ball 16 extends between cups 20 within the end of a generally downwardly extending link 21 the other end of which has a similar pair of cups 20' holding between them a pivot stud 22 fixed to the axle of the motor vehicle as at 23.

In operation, as the springs flex in movement of the vehicle, the link 21 is pushed upward and rocks the arm 15 upward, the rebound of the vehicle spring being checked by the resistance imposed in the instrument.

The present invention is concerned with lubricating the pivot bearings, that is, those at the ends of the link 21 from a central point of control. In the present embodiment, I have for this purpose, provided a lubricant inlet rigid with the instrument and with the frame, from which the bearings are lubricated, largely by gravity flow through appropriate conduits protected within the linkage. In the specific embodiment shown, the hub 14 of arm 15 is provided with an outwardly extending annular flange 24 encircled by a metallic ring 25 and a nut 26 having a groove 27 to accommodate flange 24 is threaded at 28 upon the extreme end of the shaft 13 and presses against the hub to maintain the parts assembled. The nut 26, the ring 25 and hub 14 determine a substantially cylindrical surface encircled by a metal collar 29 which in turn is held against rotation by a flat metal strap 30 secured at one end by a screw 31 to the flange 11 and at the other by a screw 32 to a corresponding integral protrusion 33 on the collar 29. The collar 29 serves primarily to mount a lubricant inlet 34 applied in a corresponding socket 35 integral with the ring, and in turn supplied from a pipe 36 extending along the vehicle frame and constituting part of the centralized lubricating system. A bore 37 extends inward from socket 35 radially through ring 25 to deliver into a well 38 formed in the exterior of annular flange 24. A bore 39 transversely of hub 14 communicates with a bore 40 along a chord of the circular hub 14, which in turn communicates at its end with a passage 41 bored longitudinally through the arm 15, the opposite end of bore 40 being plugged at 40'. The bore 41 is plugged as at 41' at eye 18 to prevent escape of lubricant therefrom. The ball stud 16 has an axial bore 42 communicating with bore 41 and plugged at 42' at its outer end, said bore in turn communicating with transverse bores 43 delivering lubricant to the bearing of said ball.

The link 21 is formed hollow with its bore, enlarged at its opposite ends as at 44. The upper enlarged end has a slot not shown through which the ball stud is inserted and clamped between ball cups 20, the outer of which is held in position by a screw plug 45, secured in place by a holding ring or cotter pin 46. The inner cup 20 is pressed outward to clamp the ball against the outer cup 20 by the action of a coil compression spring 46 reacting against a dished washer 47 held in place by the shoulder 48 between the main length of link 21 and enlargement 44. The lower pivot bearing of the link 21 is identical with that described, corresponding parts bearing the same reference numerals primed, and the ball cups therein, afford a bearing for ball stud 22, the stem of which is firmly clamped to the axle a. Each of the ball cups has a central aperture 49 therethrough, so that lubricant in excess of the requirement of the upper ball stud will drain therefrom through the aperture of cup 20 therebelow through the hollow link 21 into the funnel shaped washer 47' from which it drips through aperture 49' in the ball cup 20' to supply the bearing surface of the lower pivot stud, excess, in turn, feeding therefrom to the lower ball-cup thereof.

Inasmuch as the shaft 13, the hub 14 and the nut 26 rock in operation of the shock absorber, while the terminal collar 29 stands still, relative movement occurs therebetween, wh ch in the absence of proper precautions might result in the admission of dirt or dust to the bearing parts. To preclude such defective operation, the hub 14 is formed with an annular shoulder at its edge within which is lodged an annular compression washer 50 preferably of felt and the nut 26 is similarly recessed at its inner face to accommodate a similar annular compression washer 51. The compression washers ordinarily of greater thickness than shown in the diagram, are thus compressed when the nut 26 is applied, against opposite faces of the metallic ring 25 and accordingly will spread outward to snugly engage the inner surface of the terminal carrying collar 29. It will be seen that foreign particles could enter past the washers only by passing along both the width and the thickness thereof so that dust or dirt will be effectively excluded without impeding the normal swiveling or rocking movement of the link in use.

The terminal 34 is preferably of the pressure absorbing type, a drip plug of the type disclosed and claimed in my Patents Nos. 1,632,771 and 1,632,772, being indicated, which may be operated simultaneously in parallel or in multiple from a single centralized source of pressure to feed a plurality of bearings concurrently. The drip plug 34 being fixed with respect to the frame, no movement thereof will take place relative to the frame, as the vehicle operates and no flexible or swivel construction is required, to accommodate any such relative movement, so that rigid metal pipe, the wall of which is capable of sustaining pressure may be used.

Lubricant in operation passes from the drip plug through the bore 37 and is intercepted by the well 38 which is of sufficient width to be in registry with the outlet of the bore, throughout the range of oscillation of the linkage in operation. The well drains through the bores 39 and 40 thence through the longitudinal bore 41 into the ball stud 16 from which it lubricates the corresponding bearing, the excess, as heretofore described, dripping therefrom through the hollow link 21 to lubricate the lower bearing thereof.

Since the lubricant that has passed the drip plug is not under pressure, there is no likelihood of its being forced past the swivel joint between the hub 14, ring 25, and nut 26 on the one hand, and the collar 29 on the other. The lubricant accordingly passes on readily by gravity flow without leakage in the course previously indicated.

It will be noted that by the present arrangement all of the parts that require it are effectively lubricated without special attention thereto, whether a centralized system is employed or an oil cup or separate inlet is provided at the place where the drip plug is shown applied. The construction provides no exposed or flapping conduits, the various oil passages being in the interior thereof where they are not vulnerable, nor will dust, dirt or water enter into the path of oil flow past the washers described. The arrangement is substantially independent of the character of lubricating system employed or of the character of inlet fitting, though a drip plug is preferred. The oil piping is not subject to any mechanical strain in use and the system is of general or substantially universal application to shock absorbers of the general type shown, the only modification from standard construction being that the hub 14 of the arm 15 is slightly modified as is the nut 26, the collar 29 and the holding strap 30 therefor, being simple added elements, and the linkage is formed or provided with appropriate oil passages as described.

In Fig. 5 is shown a modification generally similar to the construction just described, but affording an inlet for the lubricant in the instrument casing rather than providing separate attachments therefor. The usual instrument casing 10' is provided with a collar 52 threaded into the interior thereof and affording a bearing for shaft 53. Closure cap 54 is threaded on the exterior of casing 10', the flange of said cap compressing a gasket 55 against a ring 56 also threaded on the casing. The shaft encircling end of cap 54 exerts pressure against a gasket 57 encircling the shaft and pressed against collar 52. The closure cap 54 which is thus a rigid part of the instrument is enlarged at one part of its outer wall to provide a socket 58 for the drip plug or other flow controlling outlet, communicating with a bore 59 radially of said cap, which, in turn, drains into a well 60 formed in an extension 61 on the hub 62 of the arm. The well drains through a bore 63 drilled from the inner face of the hub and plugged as at 63' at its inner end, which bore, in turn, communicates with a bore 64 similar to bore 41 shown in Fig. 1, to supply the bearing.

To render the construction dust-tight, an annular gasket 65 is provided in a corresponding annular groove 66 formed in the inner face of the hub and said gasket is put under compression by the nut 67 which forces the hub 62 and the gasket 65 therein inward against an annular ledge 68 formed as an integral part of the outer face of the cap 54 and extending into groove 66.

Referring now to Fig. 6 and 7, I have shown an arrangement for supplying lubricant to the linkage bearings of a shock absorber of the type shown in Figs. 1 to 4, in which the construction of the instrument casing, and nut are left unmodified. The only change in the conventional construction is the use of a hollow vertical link 21 of the same general construction shown in Fig. 1 and a small boss 70 is formed integral with the outer end of the arm 71 and bored as at 72 to provide an inlet for lubricant to the upper pivot stud. The lubricant in this case is conveyed directly from the frame in a path free from the instrument to the upper bearing of the linkage. For this purpose, I employ a length of appropriate flexible hose 73 affixed at its inlet end at an appropriate fitting 74 bolted as at 75 to the frame at the side of the instrument opposite the linkage, the flexible hose drooping as shown in general U-form and being similarly fixed at its outlet end by an appropriate fitting 76 into the socket 70.

The hose may be of any appropriate type, but is preferably of the construction shown in my copending application, Serial No. 748,012 filed November 6, 1924 and includes a metallic lining formed by crimping together the contiguous edges 77 of a helically wound strip of metal and encasing such strip in a closure 78 of rubber, preferably vulcanized thereabout, the ends being preferably protected each by a metal ferrule 79. Preferably the inlet end of the tube is substantially at the axis of the instrument and both said inlet and said outlet are in a plane perpendicular to the axis of the instrument, so that the conduit droops in a vertical plane either coinciding with or parallel to that of the arm. In operation of the linkage accordingly the conduit will deflect in its own plane and thereby any twisting thereon is avoided which would be incurred were the conduit moved out of its own plane, such twisting being especially destructive to the life of conduits of that type.

As already noted, inasmuch as hose of the character set forth is not well adapted to resist torsional strain, I have formed the terminals 76 thereof of such construction as to avoid torsional strain in the course of application or installation.

The construction and mode of application of the terminal can best be described by the process of making the same. For this purpose a pipe length 170 is inserted and soldered into the end of the metal tube 77 whereupon the rubber casing 78 is rolled thereover and vulcanized in place thereon. The ferrule 79 with the end plug 171 therefor previously press-fitted thereinto to form the thimble shown, is passed over the end of the pipe 170 for a friction fit as at 172 adjacent the end of the hose, the pipe being slightly reduced in diameter beyond the fitted portion. To permit application of the ferrule in the manner described, the pipe 170 is initially about one and one-half inches or more longer than shown, thereby affording adequate purchase for assembly whereupon the excess length of pipe is cut off. The free end of the ferrule 79 is flared as at 79' to avoid any sharp edge which might cut the hose in flexure thereof.

The threaded bushing 173 is now applied over the end of the pipe, whereupon sleeve 174 is slipped thereover, and rolled by an appropriate rolling tool, (not shown) at its outer edge into a unitary structure therewith preferably spaced about one-eighth of an inch from the free end of the pipe.

In the application of the construction described to the terminal, the pipe is inserted thereinto, the beveled face of the sleeve 174 which is a rigid part of the pipe resting on the tapered shoulder 175 within the socket, and maintaining the free end 170' thereof spaced from shoulder 176 of the corresponding socket bore. The threaded bushing 173 is now applied and its beveled inner end 173' in that process will wedge the corresponding edge of the sleeve 174 inward into rigid coaction with the pipe 170.

It will be noted that throughout the process of screwing home the threaded bushing, a periphery of relatively large diameter of the sleeve 174 rests in the socket 175 and affords a greater leverage for holding the pipe against rotation than is exerted by the area of contact between the bushing and the pipe 170 which is of much smaller diameter. There is substantially no possibility accordingly of applying any torsional strain to the pipe either in the application or in the removal of the terminal, and accordingly the flexible hose will not be torsionally strained either in installation or in disassembly.

In Figs. 8 and 9 is shown another construction for lubricating the linkage of a shock absorber or rebound check of the general type heretofore considered. In this embodiment, seamless metal pipe preferably of hard resilient brass is led from the frame to the upper ball or pivot stud 80 of the linkage and is conformed to accommodate the rocking movement of said linkage. The pipe for this purpose is preferably coiled into a helix 81 coaxial with the shaft of the instrument the first or inlet turn of which is clipped at 82' to a bowed plate 82 in turn secured to the instrument cover, the last or outlet turn of said helix being nearest the arm 83 and clipped thereto at 84, the pipe extending outward as at 85 along the arm and having a drip plug outlet fitting 86 applied into the base of the pivot stud which is longitudinally bored throughout its length substantially as in Fig. 1 and sealed or plugged at its outer end.

In this embodiment, I have preserved the usual conventional construction of link including a pair of ferrules 88 provided with ball cups (not shown) the upper of which coacts with ball stud 80 carried by the arm 83 and the lower of which coacts with a ball stud 89 secured by the usual clamp 90 to the axle. The ferrules are connected by a length of pipe 91 threaded thereinto. The ferrules are axially bored to establish communication for flow of excess lubricant from the upper bearing downward to the lower bearing. I have shown the lubricant pipe as supplied from an arm 93 of a T fitting 92 as shown in my Patent No. 1,632,772, threaded and feeding into the frame or casing of the shock absorber, the other arm 94 of which is supplied from the main 95 preferably of copper pipe. It will be seen that in this embodiment, the instrument is in no way altered from standard construction, the lubricant pipe being merely applied in the manner indicated, and clipped to the arm. This construction, moreover, presents the advantage that the pressure applied from the source is conveyed clear to the upper pivot bearing 80 so that the lubricant reaches said bearing immediately when pressure is applied and the intervening period of delay for gravity flow thereto is avoided. Moreover, this construction avoids the need for special dustproofing instrumentalities in that the seamless metal pipe is, of course, inherently dust-tight.

In Figs. 10 and 11, is shown another embodiment involving some of the principles shown in Figs. 8 and 9 but more particularly useful in lubricating systems in which some part of the pressure system leads along an axle. In this embodiment, the lubricant is conveyed upward from the axle along the generally vertical link 96 to the bearing at the upper end thereof, from which the lubricant thence overflows downward to supply the lower bearing. The general construction of link is the same as shown in Figs. 1 and 2, and the lubricant passes from the upper to the lower bearing thereof in the manner described in connection with Fig. 1. The seamless metal pipe along the axle is coiled in a helix 97 about the shank 98 of the pivot or ball stud. The coiled conduit 97 has a relatively straight upward extension 99 preferably along the exterior of the link 96 to which it is secured by clips 100, the upper end of said pipe being curved into a U shape 101, the downwardly extending end of which is clamped by a drip plug fitting 103 into a socket in the screw plug 102 at the upper end of the link 96. The operation of this arrangement will be immediately apparent. The helix readily flexes to wind and unwind for accommodating the rocking movement of the lower bearing of the shock absorber link, while the lubricant is conveyed under pressure through the pipe 99 and drips through the drip plug 103 to supply the upper bearing 104, the excess draining downward through tube 96 to oil the lower bearing.

In Figs. 12 and 13 is shown a mode of supplying the lubricant to the linkage through one of the shafts within the casing preferably through shaft 105 upon which is keyed as at 109 the arm 111, which carries the usual ball stud 112 at its outer end to which is connected the coacting link (not shown) but similar to that in Figs. 1 and 2. To admit lubricant I provide preferably in the upper wall of the casing 108, a drip plug 113 of appropriate construction, or other equivalent inlet fitting, said fitting delivering through a relatively large radial bore 114 and through the bushing 106 thence through a small radial bore 115 in the shaft which communicates with a longitudinal bore 116 through the shaft plugged at its outer end 117. The arm 111 is bored longitudinally at 119 as in Fig. 1 to communicate with bore 116 and is plugged as at 119' at its outer end. The ball stud 112 is bored at 121 to be supplied from bore 119 and the ball is transversely bored at 122 for delivery of lubricant therethrough to the bearing whence the lubricant drains downward through the link to supply the lower bearing thereof in the same manner as in the embodiment of Figs. 1 and 2. In operation, part of the lubricant from the drip plug will spread laterally from the edge of bore 114 to supply bearing 106, excess flowing in part into the casing, the bulk of the lubricant however, passing onward through radial bore 115 which communicates with bore 114 throughout the rocking range of shaft 105. If desired, some of the lubricant reaching bore 116 may be utilized for lubricating bearing 107, excess here also flowing in part as above stated, the shaft 105 being for that purpose provided with a radial bore 115'.

In the present embodiment, it will be seen that there is no flapping conduit supplied to the conventional shock absorber, which is modified merely by affording appropriate bores in different parts thereof for permitting lubricant flow. Moreover, the construction is inherently dusttight without the need for gaskets at the instrument, and the conduits are not subject to injury since they are within the structure of the instrument and its linkage.

In Fig. 14 is shown the mode of lubricating a shock absorber of the friction clutch rather than of the fluid resistance type. The general construction of one form of such shock absorber may be briefly described. It comprises a cup-shaped casing 125 having a flange 126 secured by bolts and nuts 127 to the frame of the motor vehicle and a splined shaft 128 extending axially through said cup from the inside of the frame to the outer end of which shaft is threaded a nut 129, which places the clutching surface under the desired compression against the resistance of a strong helical spring 130 coiled about the shaft 128 between the flange 131 thereon and the channel frame. The shaft 128 is provided with longitudinal splines 132 into which extend corresponding teeth or keys 133 integral with cup 125 which thus retains the shaft against rocking. The shaft 128 in turn retains against rocking a metal cup 134 which has teeth or keys extending into keyways 132 and through which the pressure of nut 129 is applied to friction cups 136 and 137 preferably of leather lodged respectively against the outer face of cup 134 and within the cup 125. A metal washer 129' is interposed between nut 129 and cup 134 to distribute the pressure over the clutching area. A metal cup member 138 is interposed between the friction cups and has an integral arm 139 extending generally horizontally therefrom and carrying a ball stud 140 at its outer end to which is connected the downwardly extending link (not shown). A cover 141 is secured over the friction assembly and has a slot 142 laterally therein to allow the rocking movement of the arm. It will be understood that the degree of tightening of nut 129 determines the compression of spring 130 and accordingly the frictional force with which the cup 138 is clamped between the friction cups 136 and 137.

In order to lubricate the friction surface, I provide an axial lubricant inlet bore 143 in the spline shaft 128 communicating with radial bores 144 that lead to the friction cups. The lubricant may be admitted to the bore 143 through an appropriate inlet which in this case I have shown as a drip plug 145 carried by the shaft 128 and of the same type as that shown in Fig. 1 which is, in turn, supplied from a pipe 146 fed from the central lubricating system. The extra length provided in the pipe 146 readily accommodates the minute displacement of the shaft 128 resulting from adjustments of the nut 129 in tightening. In this embodiment, I have not shown any means for lubricating the bearings of the linkage which may be accomplished in any of the manners previously described.

In Figs. 15, 16 and 17 I have shown another application of shock absorber in which the instrument is secured as by brackets 150 to the axle rather than to the frame, the generally horizontal arm 151 extending along the springs, and its outer end being connected with the frame by an upwardly extending link 152. In the preferred embodiment, there is bolted to the frame as at 153, a bracket 154 which extends obliquely downward and carries at its lower end rigidly clamped thereto, a ball stud 155 housed within the ferrule end of the link 152. As shown in the enlarged view, the ball is held between ball cups 153, the lower of which is pressed upward by a coil spring 254 within the ferrule, lodged in a metal dished washer or keeper 155' and urging the upper of the cups against closure plug 156 threaded and pinned into the ferrule. The ferrule is secured by a lock nut 157 against the threaded end 158 of a connecting link 159 having a small bore 160 and joined to a ferrule 161 at the lower end, preferably identical in construction with that just described. The lower ferrule 161 coacts with a ball stud 162 secured as shown to the outer end of the arm 151. Lubricant is supplied for the linkage bearings through the pipe 164 which may be supplied from a central lubricating system and the outlet end of which is secured by an appropriate terminal such as a drip plug terminal 165 in the eye 154' of the supporting bracket 154 the parts being radially bored as at 166 and the pivot stud longitudinally bored as at 167 to feed the lubricant through an upwardly extending radial bore 168 in the ball to the upper face of the upper pivot bearing, the excess draining around upper wall 155 through bore 160 to supply the lower pivot bearing 162. A key 169 maintains the pivot stud 155 in correct relation with radial bores 166 and 168 extending upward as shown.

Conventional leather boots (not shown) may be provided about the ends of the link 152 and similarly in all of the embodiments herein described in order to exclude dust. The present construction, it will be seen is of extreme simplicity requiring no modification whatsoever in the construction of the instrument and readily conveying the lubricant to the linkage bearings in a direct course from the frame.

In various claims, I have used the term "shock absorber" and this is intended as generic to instruments which absorb the original impact, to instruments which retard the rebound of the vehicle spring as well as to instruments which perform both of these functions.

Although the present invention is particularly adapted to lubrication of shock absorbers and similar functioning apparatus, in certain aspects it is broadly applicable to the lubrication of other elements of automobile chassis or to mechanisms in general.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

Having thus described my invention what I claim as new and desire to secure by Letters Patent is:

1. In a motor vehicle, in combination, a shock absorber connected to the frame and to an axle and including a retarding element and linkage connected therewith, and means for admitting lubricant to the shock absorber construction adjacent said retarding part and extending exteriorly of the retarding medium thereof, the elements of said shock absorber having lubricant conveying passages therealong supplied from said means and in open communication therewith to apply lubricant at various bearings of the linkage by series flow.

2. In a motor vehicle, structural parts including a frame and an axle, a shock absorber connected to said structural parts, and including linkage having an upper and a lower bearing, a lubricant inlet at said shock absorber substantially rigid with one of said structural parts and a permanently open passageway to convey the lubricant from said inlet to said upper bearing and means conveying excess from said upper to said lower bearing.

3. In a motor vehicle, in combination, a shock absorber instrument carried by a structural part thereof and having an associated arm with a bearing movable therewith, a lubricant inlet member at a part of said instrument substantially rigid with said structural element and conduit means leading from said inlet member to said bearing, said conduit means affording open admission from said inlet and movable at its outer end with said bearing.

4. In a motor vehicle, in combination, a shock absorber including an instrument carried by one of the structural parts connected to a vehicle spring and having a fluid resistance chamber, linkage connecting said instrument and secured to another structural part, and means for lubricating from a single inlet the bearings of said linkage, said means comprising an inlet fitting rigid with one of said structural parts and a passageway exteriorly of said chamber and affording dust-tight communication in series from said inlet to the relatively moving bearings of said linkage.

5. In a motor vehicle, in combination, a shock absorber, including an instrument secured to the frame having a fluid resistance chamber, an arm pivoted at said instrument and subjected to the resistance thereof and projecting generally horizontally therefrom and a link pivoted at the outer end thereof and projecting generally downward therefrom and having a pivot connection at its lower end to the axle, means for conveying lubricant to the pivot bearings of said link, said means comprising a lubricant inlet rigid with the frame and adjacent to, but exteriorly of said resistance chamber, a lubricant conduit at a movable part of said instrument exteriorly of said resistance chamber and in flow intercepting relation with respect to said inlet, leading to the first said pivot bearing and accommodating the pivotal movement of said link in operation of the shock absorber, and a conduit longitudinally of said downwardly extending link intercepting the overflow of lubricant from said first pivot bearing in order to supply therefrom said second pivot bearing.

6. In a motor vehicle, in combination, a shock absorber including a fluid resistance instrument rigidly attached to the frame, and having a shaft therethrough, an arm projecting generally horizontally from the outer end of said shaft and rigid therewith, a generally downwardly extending link pivoted to the outer end of said arm at one end and attached to the axle at the other end thereof, means supplying lubricant to said two bearings in series, said means comprising a lubricant inlet rigid with the places of attachment of said shock absorber installation including said frame and axle, a conduit in fluid intercepting relation therewith, providing a substantially dust-tight passage from said inlet to the upper of said bearings, said conduit open throughout the relative movements between said inlet and said bearing, said link affording a passageway for gravity flow of lubricant from the upper to the lower bearing thereof.

7. In a motor vehicle, in combination, an axle, a shock absorber instrument carried by the frame and rigid therewith and including a fluid resistance chamber, an operating shaft protruding therefrom, an arm fixed to said shaft and projecting generally horizontally therefrom, a generally downwardly extending link pivoted at one end to the outer end of said arm and at the other end to said axle, means supplying the pivot bearings of said link from said frame, said means comprising an inlet fixed with respect to said frame, contiguous to said instrument but exteriorly of said fluid resistance chamber and a passageway in fluid intercepting relation with respect to said inlet and extending contiguous to the outer side of said instrument, and to the upper bearing of the link, the downwardly extending link being hollow to intercept excess of lubricant from said bearing for leading it to the bearing at the lower end thereof, said passageway accommodating the pivotal movement of said arm and affording a dust-tight course for lubricant.

8. In a motor vehicle, in combination, a shock absorber including an instrument fixed to the frame and having a shaft subjected to the resistance of liquid in said instrument and protruding from said instrument, a generally horizontal arm keyed to said shaft and a generally vertical link pivoted at its upper end to the outer end of said arm and at its lower end to the axle, means for supplying lubricant to the bearings of said link from said frame, said means comprising a lubricant inlet carried by a part on said instrument maintained fixed with respect to said frame, the protruding parts movable with said shaft affording lubricant passageways intercepting the lubricant from said inlet and conveying it lengthwise of said generally horizontal arm to the bearing at the outer end thereof, and means interposed between said fixed inlet and said pivoting parts to prevent the escape of lubricant from therebetween.

9. In a motor vehicle, in combination, a shock absorber including an instrument fixed to the frame and having a shaft subjected to the resistance of liquid in said instrument and protruding from said instrument, a generally horizontal arm keyed to said shaft and a generally vertical link pivoted at its upper end to the outer end of said arm and at its lower end to the axle, means for lubricating the bearings of said shock absorber, said means comprising a lubricant inlet carried upon the structure of said instrument and rigid with said frame, a well on the pivoting structure in fluid intercepting relation with respect to said inlet, a passageway from said well leading lengthwise of said pivoting structure to the bearing at the outer end thereof, and a passageway lengthwise of the generally vertical link conveying excess lubricant from said upper bearing by gravity flow downward to the lower bearing, and annular compression gasket means, interposed between the fixed inlet and the rocking structure to exclude dust from entering the gap between the relatively moving parts thereof.

10. In a motor vehicle, in combination, a shock absorber including an instrument fixed to the frame and having a shaft subjected to the resistance of liquid in said instrument and protruding from said instrument, a generally horizontal arm keyed to said shaft and a generally vertical link pivoted at its upper end to the outer end of said arm and its lower end to the axle, said instrument having a generally annular member held rigid with the frame and coaxial with the instrument shaft and carrying an inlet member through which lubricant is supplied to the bearings of the link, a well in the rocking elements supplied from said inlet, passageways in the rocking elements leading the lubricant to the link bearings, and compression gasket means interposed in the path of escape of lubricant from said inlet at the contiguous surface of said rocking structure, in order to exclude dust from the path of lubricant flow.

11. In a motor vehicle, in combination, a shock absorber including an instrument fixed to the frame and having a rocking shaft subjected to the resistance of liquid in said instrument and protruding from said instrument, a generally horizontal arm keyed to said shaft and rocking therewith and a generally vertical link pivoted at its upper end to the outer end of said arm and at its lower end to the axle, a cap threaded upon the extreme end of said shaft and exerting pressure against the hub of said arm annular compression gasket means maintained under pressure by the reaction between said cap and said hub, an annular metallic member encircling the cap and hub and the compression gasket, means securing said annular member against displacement with respect to said frame, a lubricant inlet fitting carried by said annular member, and passageways bored into said rocking structure to convey the lubricant from said inlet lengthwise of said arm to the bearing at the outer end thereof.

12. In a shock absorber, in combination, a fluid resistance instrument having a protruding shaft, an arm having a hub keyed to said shaft, a cap threaded to the exterior end of said shaft and pressing against the hub of said arm, a metal ring encircling a corresponding shoulder determined between said hub and cap and interposed therebetween, annular members maintained under compression between said hub and said ring and between said ring and said cap, an inlet carrying member comprising a metallic annular element encircling said ring and said gaskets, and part of said hub and said cap, a stiff metallic member secured to said instrument and to said ring to maintain the latter against displacement, a lubricant inlet member carried by said ring, a well carried by said hub and supplied from said inlet member, bores through said hub and a passageway along said arm to convey lubricant from said inlet onward to the bearings of said link.

13. In a shock absorber, in combination, a fluid resistance instrument having a cap secured thereto, an operating shaft protruding through said cap, an arm having a hub keyed to said operating shaft, an annular compression gasket encased between the hub and a corresponding flange on said cap, a lubricant inlet at the outer part of said cap, feeding through a bore through said cap inward to between said cap and said hub and a nut threaded on the outer end of said shaft pressing said hub into firm engagement with said cap.

14. In a shock absorber, in combination, an instrument mounted on the frame having a shaft protruding therefrom, an arm having a hub keyed to said shaft, a gasket against the outer face of said hub, a metal ring encircling a part of said hub and pressing against said gasket, a cap threaded upon the end of said shaft and pressing said hub inward, said cap engaging said ring, a second gasket interposed between said cap and said ring, a metallic annulus encircling said cap, said hub, said ring and said gaskets, a strap secured with respect to said instrument and maintaining said annulus rigidly in position, a lubricant inlet fitting fixed to said annulus, a bore through said annulus and through said ring, a well in said hub intercepting lubricant from said bore, an oblique bore through said hub draining said well and a longitudinal bore through said arm leading to the bearing at the outer end thereof.

15. The combination set forth in claim 14 in which the arm has a ball stud at the outer end thereof bored to receive lubricant from the longitudinal bore therein, a downwardly extending hollow link having a socket bearing on said ball and lubricated therefrom and a bearing at the lower end thereof and means to conduct the excess lubricant from said ball downward through said link to lubricate the bearing at the lower end thereof.

16. In a shock absorber, in combination, a fluid resisting instrument having a cap secured thereto, an axial shaft protruding from said instrument and said cap, an arm keyed to said shaft, a compression gasket in an annular trough in said hub and compressed therein against an annular flange on said cap, a lubricant inlet fitting secured in a socket in the outer periphery of said cap, a bore through said cap leading to said hub and a conduit carried by said arm delivering the lubricant onward to the outer end thereof.

17. In a lubricant distributing system, in combination, a shaft, a hub on said shaft, a cap attached to the exterior end of said shaft and pressing against the hub, a ring encircling the junction between said hub and said cap, another ring fitting between the hub and the cap, beneath and attached rigidly to the first mentioned ring, extending radially inwardly a short distance and adapted to maintain said first mentioned ring in position, annular members maintained under compression between said hub, said rings and said cap and a lubricant inlet member carried by said rings.

18. In a lubricant distributing system, in combination, a rotatable member, a cap of substantially the same external diameter as the member pressing against said member, a ring encircling the junction between said member and said cap, another ring fitting between the member and the cap, beneath and attached rigidly to the first mentioned ring and adapted to maintain said first mentioned ring in position, annular gaskets maintained under compression between said member, said rings and said cap and a lubricant inlet member carried by said rings.

19. In a lubricant distributing system, a swivel connection comprising a central member, an annular member encircling said central member held in position by the cooperation of a groove in one of the members and a ridge in the other, said ridge being adapted to slide in said groove, lubricant conduits in said annular member and in said central member and a well at the contacting surface between the central member and the annular member adapted to receive lubricant from one conduit and supply it to another.

20. In a lubricant distributing system, in combination, a shaft, an arm having a hub on said shaft, a gasket against the outer face of said hub, a ring encircling a part of said hub and pressing against said gasket, a cap upon the end of said shaft and pressing said hub inwardly, said cap engaging said ring, a second gasket interposed between said cap and said ring, a metallic annulus encircling said cap, said hub, said ring and said gaskets, means for maintaining said annulus rigidly in position, a lubricant inlet fitting fixed to said annulus, a bore through said annulus and through said ring, a well in said hub intercepting lubricant from said bore, an oblique bore through said hub draining said well and a longitudinal bore through said arm leading to the other end thereof.

21. In a lubricant distributing system for an automobile chassis, in combination, an arm having a hub rotatably mounted on said chassis and a bearing at the far end thereof, a metallic annulus encircling said hub, means for maintaining said annulus rigidly in position, a lubricant inlet attached to said annulus, a bore through said annulus communicating with said inlet, a well in said hub intercepting lubricant from said bore, a bore through said hub draining said well and a longitudinal conduit communicating with said bore along said arm leading to the bearing at the other end thereof.

22. In a lubricant distributing system for an automobile chassis, in combination, an arm having a hub rotatably mounted on said chassis and a bearing at the far end thereof, an annular member encircling said hub, an inwardly extending projection on said member, a cooperating groove on said hub, said groove and projection being adapted to hold said annular member and hub in predetermined position, a lubricant inlet fitting upon said annular member, a conduit through said annular member communicating with said inlet, a well in said hub intercepting lubricant from said conduit and a conduit along said arm communicating with said well leading to the bearing at the other end thereof.

23. In a lubricating system, a series lubricating installation for a vertically inclined ball stud link, comprising a hollow link, enlargements in the upper and lower ends of the link to receive ball studs, ball studs in said enlargements, bearcups in said enlargements to embrace said studs, a bore through the arm of said upper ball stud to the center thereof to supply lubricant to the link, a radial bore communicating with said first mentioned bore, positioned along the axis of the link and leading to the center of the bearing surface of the uppermost cup and funnel-shaped members in said hollow arm to guide the lubricant downwardly after passing through the upper bearing surface while it flows through the hollow arm to the lower bearing surface.

24. In a lubricating system, a series lubricating installation for a vertical ball stud link comprising an inlet bore through the stem of the upper stud, a radial bore from said inlet bore to the bearing surface of said stud and a conduit positioned in said link to conduct the lubricant passing through the ball stud bearing to the lower bearing of the link.

25. In a series lubricating system for a chassis element provided with upper and lower bearings, said upper bearing having a loaded upper surface an inlet lubricant conduit to supply lubricant to the loaded upper surface of the upper bearing and a conduit from said upper bearing to said lower bearing to receive lubricant which has lubricated and passed through the upper bearing and supply it to the lower bearing.

26. A series lubricating installation for an arrangement including relatively moving parts, a hollow link connecting the same, ball studs at different levels attached to said parts and bearing within the ends of said link, which bearings are to be lubricated; said installation comprising an inlet bore from one of the relatively moving parts to and through a loaded side of the more elevated ball stud, an arrangement for conducting the lubricant which has passed through the loaded bearing surface of said ball stud through the link and to the other ball stud, and means for admitting the lubricant to the bearing surface of said second ball stud.

27. In a lubricating system, a series lubricating installation for a downwardly inclined ball stud link comprising an inlet bore through the stem of the upper stud, a radial bore from said inlet bore to a bearing surface of said stud, means for loading the bearing surface of said stud including a spring-pressed cup, a conduit positioned in said link to conduct the lubricant passed through the upper ball stud bearing to the lower ball bearing of the link and means for loading the lower bearing also including a spring-pressed cup.

28. In a motor vehicle, in combination, a frame, an axle, a shock absorber including an instrument affixed to one of said vehicle members, said instrument having a shaft, the rotary motion of which is impeded by fluid in said instrument, an arm fixed to a protruding part of said shaft and pivoting therewith and a link pivoted to the outer end of said arm at one end and extending to and pivoted to the other of said vehicle elements at the opposite end thereof, a lubricant inlet fixed to one of said vehicle members, a seamless metal pipe supplied therefrom and conformed in a helix substantially coaxial with the pivot joint nearest said inlet, thereby accommodating the pivotal movement thereof, said conduit leading lengthwise at the contiguous arm or link to supply with lubricant the bearing at the opposite end thereof.

29. In a motor vehicle, in combination, a frame, an axle, a shock absorber including an instrument affixed to one of said elements, said instrument having a shaft, the rotary motion of which is impeded by fluid in said instrument, an arm fixed to a protruding part of said shaft and a second arm pivoted to the outer end of said first arm at one end and extending to and pivoted to the other of said elements at the opposite end, a lubricant inlet fixed to one of said vehicle elements, a seamless metal pipe supplied therefrom and conformed in a helix substantially coaxial with the pivot joint nearest said inlet, thereby accommodating the pivotal movement thereat, said conduit leading lengthwise of the contiguous arm to supply with lubricant the pivot bearing connecting said members, one of said arms extending downwardly and being provided with a longitudinal passageway to convey lubricant by gravity flow from the upper to the lower bearing thereof.

30. In a motor vehicle, in combination, a shock absorber having an instrument secured to the frame, a shaft through said instrument, the rotary motion of the shaft being impeded by the fluid in said instrument, an arm extending generally horizontally from said shaft and secured thereto, a link extending generally vertically and having pivot bearings at its upper and lower ends respectively with said arm and the axle, means for supplying the bearings of said vertical link with lubricant from said axle, said means comprising a pressure-conveying conduit having a part rigid with said axle, coiled into a helix contiguous to the axle end of the link and including a generally straight run secured to said link and extending the length thereof and having an outlet at its upper end feeding lubricant to the upper bearing, said link having a passageway for gravity flow of lubricant downward therealong from the upper bearing to the lower bearing thereof.

31. In a motor vehicle, in combination, a shock absorber having an instrument secured to the frame, a shaft through said instrument and resisted by fluid therein against rotation, an arm extending generally horizontally from said shaft and secured thereto, a link extending generally vertically and having pivot bearings at its upper and lower ends respectively, with said arm and the axle, means for lubricating the bearings of said vertical link, said means comprising a passageway rigid with the axle for conveying lubricant under pressure, said pasageway including a conduit of seamless metal pipe conformed as a helix substantially coaxial with the pivot bearing near the axle end, thereby to accommodate the pivotal movement thereof and leading to a longitudinal length of pipe affixed to the vertical link, said latter pipe having a pressure absorbing outlet fixed to the vertical link and leading to the upper bearing thereof, said vertical link being hollow to drain excess lubricant from said upper bearing downward to supply the lower bearing.

32. A shock absorber for a motor vehicle including a fluid resistance instrument carried by the fame, a generally horizontal arm secured thereto, a generally vertical link pivoted to the end of said arm at one end and to the axle at the opposite end, means for supplying lubricant to the bearings of said link, said means comprising a lubricant inlet carried by the frame, a flexible conduit secured at one end to the frame, supplied from said inlet drooping downward in the general plane of said arm, secured at its opposite end to the outer end of said arm, and feeding lubricant to the bearing thereof, said vertical link having a passageway associated therewith for delivering excess lubricant from the upper to the lower bearing thereof.

33. In combination, a shock absorber comprising a fluid-resisting instrument carried by the frame, a generally horizontal arm secured to the operating shaft downwardly extending link having a socket embracing said stud and having a pivot stud connection to the axle at its lower end, means for lubricating said link, said means comprising a flexible conduit secured at its inlet end to the frame, at the side of said instrument opposite said link and drooping in a U-shaped conformation in the general plane of said arm and having an outlet fitting in a corresponding socket in the outer end of said arm, the pivot stud being bored to deliver lubricant from said flexible conduit therethrough from which the lubricant flows outward to the bearing surface thereof, said vertical link being hollow to drain excess lubricant from the upper to the lower bearing thereof.

34. In a motor vehicle, in combination, a shock absorber having a downwardly extending link, the upper end of which in operation pivots about an axis in the frame as well as an axis on the axle, means for lubricating said pivot from a centralized source of control, said means comprising a pressure tight conduit having a pressure absorbing outlet at said pivot, said link including a passageway draining lubricant from said pivot and delivering it to a lower bearing.

35. In combination, a supporting frame, an arm pivotally connected to said supporting frame and having a pivotal bearing at its outer end away from said frame, a linkage connected to said outer pivotal bearing, means for lubricating said outer pivotal bearing, said means comprising a flexible conduit secured at its inner end to the frame closely adjacent to the pivotal axis upon said frame and drooping in a U-shaped conformation in the general plane of said arm and having an outlet fitting in a corresponding socket in the outer end of said arm, the outer pivotal bearing being bored to deliver lubricant from said flexible conduit from which lubricant flows outward to the bearing surface thereof.

36. In a motor vehicle, the combination of a hydraulic shock absorber and a chassis lubrication system connected to supply liquid to the shock absorber.

37. In a motor vehicle, the combination of a hydraulic shock absorber, a chassis lubricator adapted to lubricate some of the chassis bearings, and means for supplying oil from the lubricator to the shock absorber.

38. In a motor vehicle, the combination of a hydraulic shock absorber, a chassis lubricating system, and a connection between the system and the shock absorber.

39. In a motor vehicle, a shock absorber system having connections associated with the frame, and a circulating bearing lubricating system carried by the vehicle frame, said system being connected with said shock absorber connections.

JOSEPH BIJUR.